United States Patent

Kirkman

[15] 3,635,249

[45] Jan. 18, 1972

[54] SELECTOR VALVES AND SEALS THEREFOR

[72] Inventor: Douglas Frederick Kirkman, Ickenham, England

[73] Assignee: I.V. Pressure Controllers Limited, Feltham, England

[22] Filed: Jan. 30, 1970

[21] Appl. No.: 7,106

[30] Foreign Application Priority Data

Feb. 6, 1969 Great Britain..........................6,579/69
May 23, 1969 Great Britain......................26,569/69

[52] U.S. Cl..........................137/625.48, 277/125, 251/324, 137/625.69
[51] Int. Cl..........................................................F16k 11/07
[58] Field of Search......................277/35, 58, 125; 251/324; 137/625.48, 625.61–625.69

[56] References Cited

UNITED STATES PATENTS

| | | | |
|---|---|---|---|
| 583,822 | 6/1897 | Shem | 137/625.48 X |
| 789,026 | 5/1905 | Huston | 137/625.69 |
| 1,057,554 | 4/1913 | Jacobs | 137/625.69 |
| 2,126,739 | 8/1938 | Corbin | 251/324 X |
| 2,471,285 | 5/1949 | Rice | 137/625.68 |

*Primary Examiner*—Henry T. Klinksiek
*Attorney*—Waters, Roditi, Schwartz & Nissen

[57] ABSTRACT

The spool of a selector valve of the spool-type is provided with sealing means in the form of at least one annular washer of plastic or elastomeric material which is clamped between two parts of the spool body and is so dimensioned relatively to the latter as to project outwardly therefrom to provide a flexible annular sealing flap encircling the spool body. The sealing flap is capable of limited flexing movement under the action of fluid or liquid pressure the arrangement being such that with fluid or liquid acting in one direction along the spool the sealing flap will perform no sealing function while when the direction of fluid or liquid pressure is reversed said flap will be urged into an operative position wherein it will sealingly engage the inner surface of the bore in the valve body in which the spool is axially movable.

8 Claims, 4 Drawing Figures

SELECTOR VALVES AND SEALS THEREFOR

This invention is concerned with selector valves of the spool type such as are commonly employed in hydraulic or pneumatic systems.

It is one object of the invention to evolve an improved method of and means for sealing the spools of such selector valves.

According to the present invention there are provided on the spool of a selector valve of the spool type sealing means for preventing undesired passage of fluid or liquid between the spool and the inner surface of a bore in the valve body in which said spool is axially movable, such means comprising at least one annular washer of plastics or elastomeric material which is clamped between two parts of the spool body and is so dimensioned relatively to the latter as to project outwardly therefrom to provide a flexible annular sealing flap therearound, the arrangement being such that such sealing flap will be capable of a limited flexing movement under the action of fluid or liquid pressure into a sealing position wherein it will sealingly engage the inner surface of the bore on the valve body.

In order that the said invention may be clearly understood and readily carried into effect reference will now be made to the accompanying drawings in which.

Figure 1:
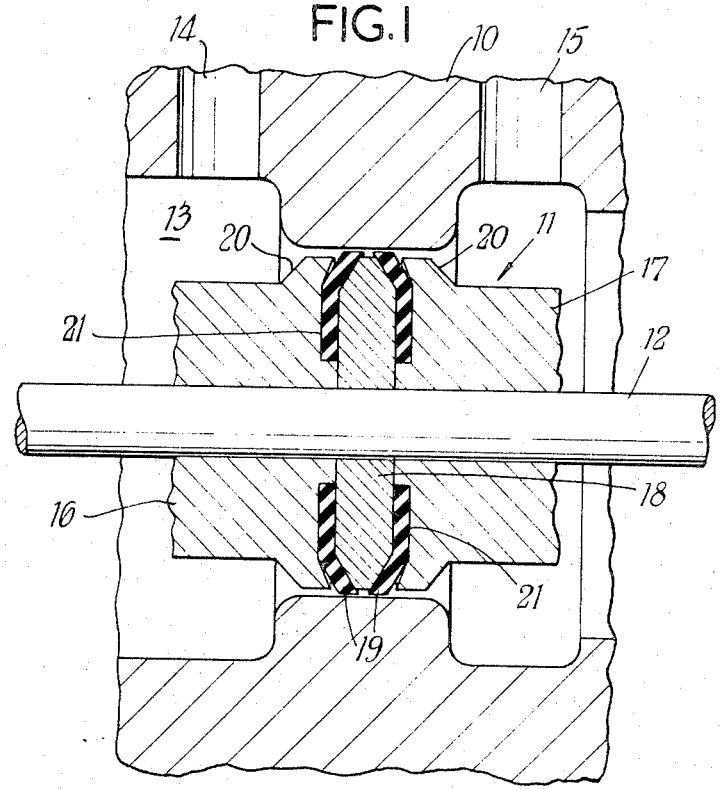
FIG. 1 shows in section a portion of a selector valve of the spool type.

Referring now to FIG. 1, numeral 10 denotes a part of the body of a selector valve while 11 generally denotes a part of a valve spool which is carried on an actuating rod 12. The body defines a bore 13 in which the spool is slidably accommodated and said body is in known manner equipped with a plurality of ports or flow passages for the working fluid or gas, two such ports or passages being indicated at 14 and 15. The spool 11 is made up of a plurality of collars, spacers and seals which are mounted on the rod 12 the number of and disposition of such components depending on the number and disposition of the ports or flow passages in the body. In FIG. 1, 16 and 17 denote portions of two collars between which an annular spacer 18 and two annular seals 19 are disposed. That end of each collar adjacent a seal is provided with a radially directed lip or flange 20 while the end face of each collar is also formed with an annular recess 21 which is of dished shape to conform to or to induce the required form in the adjacent seal 19. The spacer 18 is formed with a tapered periphery to provide support for annular skirt portions of the two seals 19.

The seals 19, which may be formed of plastic or elastomeric material may comprise plain washers or they may be preformed to a shape such as is shown in the drawing.

When the spool is in the position illustrated in the drawing, pressure fluid entering the port 14 will tend to depress the left hand seal and to flex the right hand seal 19 so that the frustoconical sealing lip will effectively seal against the inner surface of the bore 13 and prevent any flow of fluid to the port 15. With pressure applied to the port 15 the left hand seal 19 will be flexed so that flow of fluid to the port 14 will be prevented. On appropriate axial movement of the rod 12 and hence of the spool, fluid flow will be permitted from port 14 to port 15 or vice versa.

Figure 2:
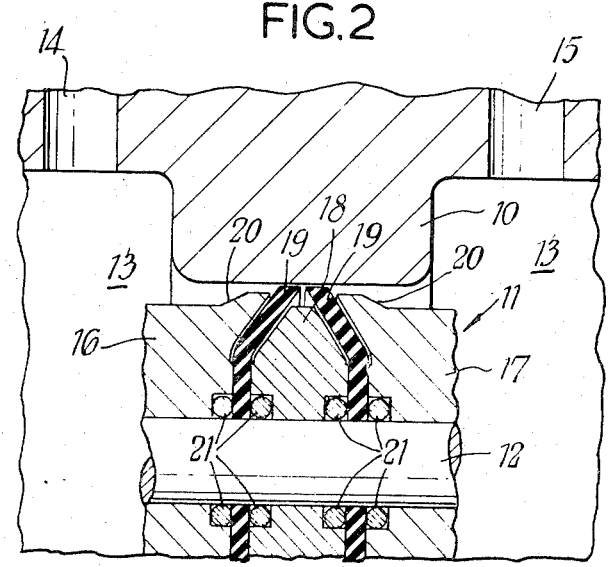
FIG. 2 is a view similar to that of FIG. 1 but illustrating a modified seal assembly.

In the embodiment illustrated in FIG. 2 wherein the same reference numerals have been employed to denote those components which correspond to the components of FIG. 1 the shape or profiling of the end faces of the collars 16, 17 and of the spacer 18 have been modified. Further the seals 19 have been slightly modified and at the inner peripheries thereof additional seals 21 have been incorporated. In the embodiment illustrated the seals 21 each comprise a pair of "O" rings disposed one at each side of the inner periphery of each seal, such rings which are preferably formed of an elastomeric material such as rubber being accommodated in annular recesses appropriately formed in the collars 16, 17 and in the spacer 18. In place of "O" rings as indicated at 21, sealing rings of any other appropriate form may be employed.

As before, the seals 19 may be formed of a plastic or elastomeric material and they may comprise plain washers or be preformed to a shape such as is shown in the drawings.

Figure 3:
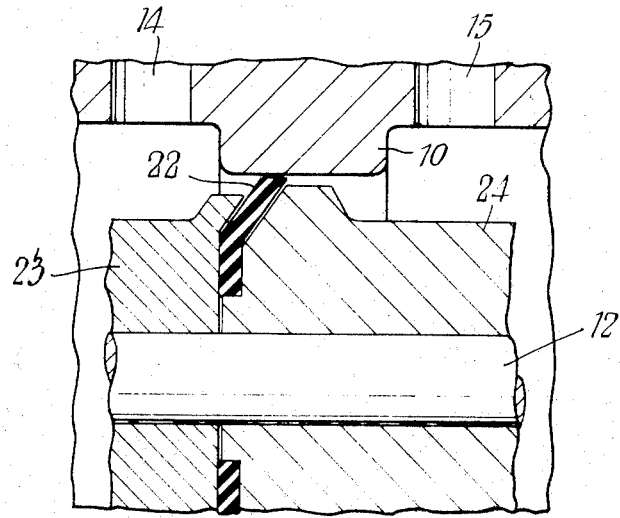
FIG. 3 illustrates a further possible modification.

While in the foregoing embodiments illustrated in FIGS. 1 and 2 the seals 19 are employed in pairs it may be desirable or only necessary in certain conditions to employ a single seal, for example, at the end of a spool or when fluid flow between two ports is always required to take place in one direction only. Such an arrangement is illustrated in FIG. 3 wherein numeral 22 denotes a seal which is clamped between two appropriately profiled collars 23, 24 which conform to or impart the necessary form to the seal and also serve to support the same. If desired additional sealing means such as indicated at 21 (FIG. 2) may be provided at the inner periphery of the seal which together with the collars 23, 24 will be appropriately modified for that purpose.

Figure 4:
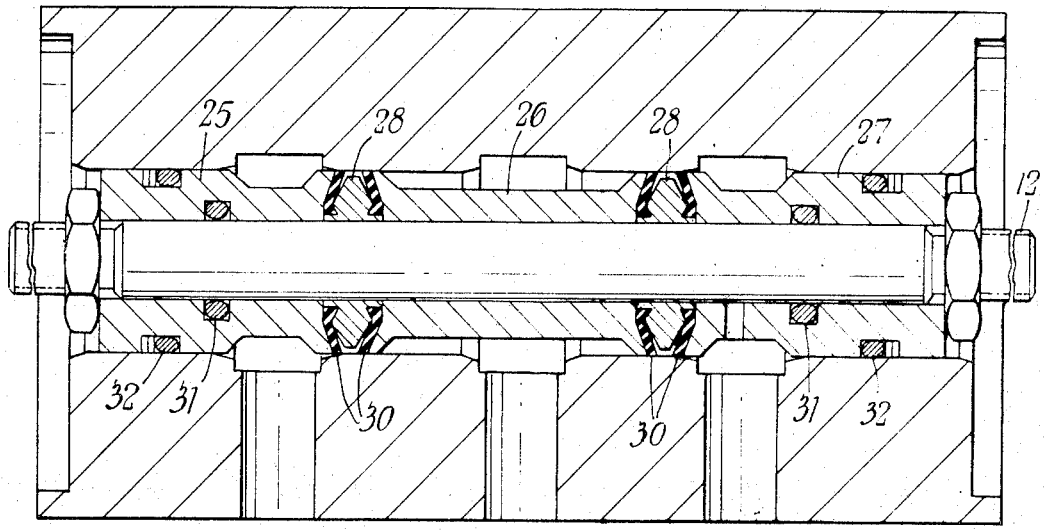
FIG. 4 shows in section a complete selector valve of the spool type and illustrates yet another modification in the seal assemblies.

In FIG. 4 there is illustrated diagrammatically a complete selector valve of the spool type wherein the spool is made up of three collars 25, 26, and 27 two spacers 28 and two sets of seals 30. In this case the inner ends of each of the end collars 25, 27 and the opposite ends of the intermediate collar 26 are appropriately profiled or shaped to support the seals while the form of the spacers 28 has been modified to accommodate seals of slightly differing form from those shown in the preceding figures or to impart a slightly different form to seals originally in the form of plain washers. In the embodiment shown in FIG. 4 the end collars 25, 27 are provided with seals 31, 32 which are respectively adapted to prevent leakage of fluid along the actuating rod 12 and leakage between said collars and the inner surface of the bore in the valve body. Also in the actual embodiment illustrated in FIG. 4, the valve is equipped with three ports the flow of liquid or fluid between which is controlled in known manner in dependence upon the axial setting of the spool. The selector valve shown in FIG. 4 is however purely exemplary and as hereinbefore indicated the number and dimensions of collars, spacers and seals assembled on the valve actuating rod will depend on the number, disposition and dimensions of the flow ports or passages in the valve body.

It will be appreciated from the foregoing that by employing flexible washer-type seals of the kind indicated a valve spool will effectively be provided with a number of annular sealing flaps which, while being effectively supported and restrained from excessive movement, will nevertheless be capable of limited movement, under the action of the pressure of liquid or fluid being controlled, into and from sealing positions wherein they will substantially eliminate leakage between the spool and the body of the valve.

A valve having its spool sealed in the manner indicated may be employed for controlling fluids or liquids which are of widely varying types such as water or soluble oil and/or are under widely varying pressures, for example, say from 0 to 6,000 p.s.i. Furthermore by reason of the relatively large clearance which exists between the metal parts of the spool and the valve body a valve of the kind indicated herein will be much less prone to jamming than a conventional spool valve and moreover the presence of such clearance will also enable the valve to be used for controlling dirty liquids or fluids although in such cases the presence of foreign matter may reduce the effectiveness of the seals to some extent.

The method of construction and assembly of a valve spool indicated herein will allow the production of standard and miniature form valves and it will by virtue of the avoidance of the necessity for honing, hardening and grinding operations, result in a reduction of production costs. Costs may well also be reduced by reason of the fact that the metal components of a valve spool may be made from bar stock.

I claim:

1. A selector valve of the spool type comprising a. a valve body having an inner wall surface defining a bore therein
b. a valve spool axially movable in said bore and including axially separable parts, and
c. at least one flexible annular sealing washer of a plastic or elastomeric material clamped between said axially separable parts and including an annular skirt portion having a frustoconical sealing lip around said valve spool such that fluid pressure acting in one axial direction on said lip tends to press said lip into edge sealing contact with said inner wall surface and fluid pressure acting on said lip in the opposite axial direction tends to deflect said lip out of said sealing contact.

2. A selector valve as claimed in claim 1 wherein said axially separable parts are provided with axially spaced angled support faces and said flexible annular sealing washer is mounted between said axially space angled support faces of the spool parts.

3. A selector valve as claimed in claim 2 in which said spool comprises a central actuating rod, said axially separable parts being constituted by a plurality of annular collar members assembled on said rod, the sealing washer being clamped between two such collar members.

4. A selector valve as claimed in claim 3 in which two of said sealing washers are mounted between two adjacent collar members, said valve further comprising an annular spacing element interposed between said washers so that fluid pressure acting in one direction will cause one washer to be effective to provide a seal while fluid pressure acting in the opposite direction will cause the second washer to be operative.

5. A selector valve as claimed in claim 4 in which each sealing washer is of dished shape, the end faces of the collar members abutting the washer being similarly shaped to conform to, or induce the requisite shape in, the washers.

6. A selector valve as in claim 5 in which each spacing element includes an outer peripheral portion which is tapered.

7. A selector valve as claimed in claim 6 comprising additional sealing means interposed between each sealing washer and the members between which it is clamped.

8. A selector valve as claimed in claim 2 wherein said lip projects beyond the valve spool, said skirt portion which is mounted between the angled support faces of the spool parts being inclined with respect to the axes of the bore.

* * * * *